United States Patent
Redshaw

(10) Patent No.: US 11,069,024 B2
(45) Date of Patent: Jul. 20, 2021

(54) PRIMITIVE PROCESSING IN A GRAPHICS PROCESSING SYSTEM WITH TAG BUFFER STORAGE OF PRIMITIVE IDENTIFIERS

(71) Applicant: Imagination Technologies Limited, Kings Langley (GB)

(72) Inventor: Jonathan Redshaw, St. Albans (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

(21) Appl. No.: 16/867,272

(22) Filed: May 5, 2020

(65) Prior Publication Data

US 2020/0265547 A1      Aug. 20, 2020

Related U.S. Application Data

(63) Continuation of application No. 16/240,262, filed on Jan. 4, 2019, now Pat. No. 10,679,322, which is a (Continued)

(30) Foreign Application Priority Data

Dec. 13, 2013   (GB) ..................... 1322042

(51) Int. Cl.
*G06T 1/60* (2006.01)
*G06T 15/40* (2011.01)
(Continued)

(52) U.S. Cl.
CPC .............. *G06T 1/60* (2013.01); *G06T 7/40* (2013.01); *G06T 15/405* (2013.01); *G06T 17/10* (2013.01); *G06T 2200/28* (2013.01)

(58) Field of Classification Search
CPC ...................................................... G06T 1/60
See application file for complete search history.

(56) References Cited

U.S. PATENT DOCUMENTS 7,505,036 B1   3/2009  Baldwin
7,659,893 B1   2/2010  Oberman et al.
(Continued)

FOREIGN PATENT DOCUMENTS

CN   1581234 A   2/2005
CN   1609898 A   4/2005
(Continued)

*Primary Examiner* — Shivang I Patel
(74) *Attorney, Agent, or Firm* — Potomac Law Group, PLLC; Vincent M DeLuca

(57) ABSTRACT

A graphics processing system has a rendering space which comprises one or more tiles. The system comprises a processing module configured to perform hidden surface removal for primitives of a tile to determine primitive identifiers identifying the primitives which are visible at each of a plurality of sample positions in the tile. A set of two or more tag buffers store the primitive identifiers determined for each of the sample positions in a tile, thereby representing overlapping layers of primitives. A tag control module controls: (i) selection of a tag buffer for the storage of each of the primitive identifiers according to the layering of the primitive identifiers stored in the tag buffers, and (ii) flushing of primitive identifiers from the tag buffers. A texturing engine applies texturing to the primitives identified by the flushed primitive identifiers.

20 Claims, 10 Drawing Sheets

Related U.S. Application Data continuation of application No. 15/658,550, filed on Jul. 25, 2017, now Pat. No. 10,210,596, which is a continuation of application No. 14/567,066, filed on Dec. 11, 2014, now Pat. No. 9,747,660.

(51) Int. Cl.
*G06T 7/40* (2017.01)
*G06T 17/10* (2006.01)

(56) References Cited

U.S. PATENT DOCUMENTS

| | | |
|---|---|---|
| 2005/0057573 A1 | 3/2005 | Andrews |
| 2005/0057574 A1 | 3/2005 | Andrews |
| 2005/0162435 A1 | 7/2005 | Hashimoto et al. |
| 2008/0007560 A1* | 1/2008 | Howson .................. G06T 15/40 345/531 |
| 2008/0211810 A1 | 9/2008 | Falchetto |
| 2011/0227921 A1* | 9/2011 | Redshaw .............. G06T 15/005 345/426 |
| 2013/0241938 A1 | 9/2013 | Gruber et al. |
| 2014/0354654 A1 | 12/2014 | Heggelund et al. |
| 2014/0354682 A1 | 12/2014 | Heggelund et al. |
| 2019/0139187 A1 | 5/2019 | Redshaw |
| 2020/0105052 A1 | 4/2020 | Redshaw |

FOREIGN PATENT DOCUMENTS

| | | |
|---|---|---|
| CN | 1739117 A | 2/2006 |
| CN | 101091203 A | 12/2007 |
| CN | 101308582 A | 11/2008 |
| CN | 101639929 A | 2/2010 |
| CN | 102096897 A | 6/2011 |
| CN | 102822870 A | 12/2012 |
| CN | 102822871 A | 12/2012 |
| CN | 103310409 A | 9/2013 |
| CN | 104715503 A | 6/2015 |
| GB | 2404316 A | 1/2005 |

\* cited by examiner

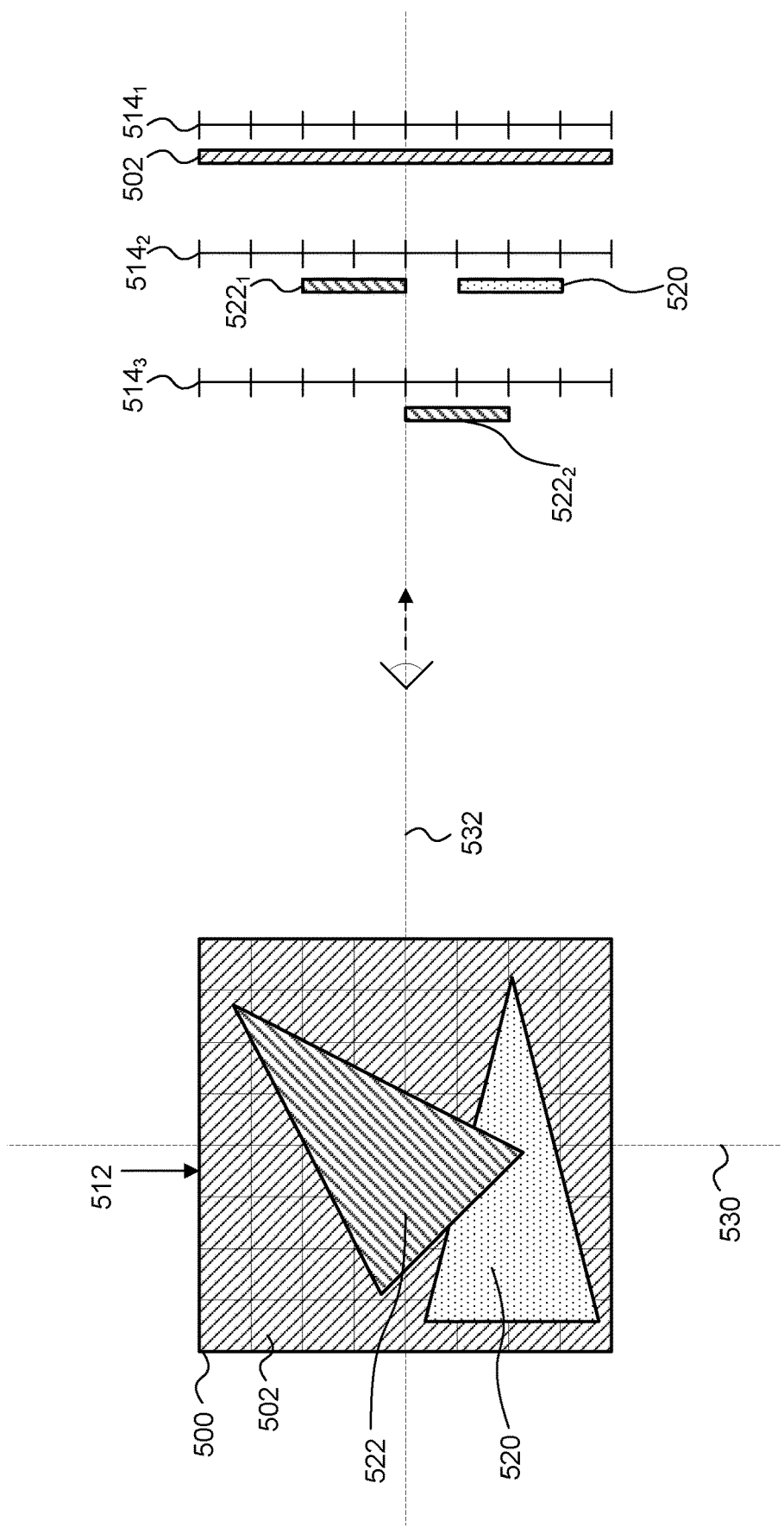

PRIMITIVE PROCESSING IN A GRAPHICS PROCESSING SYSTEM WITH TAG BUFFER STORAGE OF PRIMITIVE IDENTIFIERS

BACKGROUND

In a 3D graphics processing system, objects of a scene are represented with groups of primitives, which are typically projected, scan converted, textured, and shaded during rendering of the scene. A primitive has a simple geometric shape, often a triangle, defined by the positions of one or more vertices (e.g. three vertices in the case that the primitive is a triangle) to which a texture can be applied. The rendering of a 3D scene processes the primitives to form an image comprising an array of image pixels. One step in the rendering process is to determine, for each of a plurality of sample positions of the image, which of the primitives is/are visible. This process is called hidden surface removal (HSR). Primitives, or parts of primitives, which are hidden by other primitives do not need to be considered further in the render. In order to perform HSR, the depths (i.e. the distances from the viewpoint) of primitives in the scene for each sample position are considered in order to determine which primitives are visible at each pixel position. Primitives may be opaque or translucent. A rendering technique in which textures are used to create holes in otherwise opaque primitives is known as "punch through". For opaque primitives, the final rendered pixel value at a pixel position (which may correspond to one or more of the sample positions) will usually be given by the textured primitive which has the smallest depth value at that pixel position. For translucent primitives the final rendered pixel value at a pixel position may be given by a blend of more than one of the textured primitives which have the smallest depth values at that pixel position. When a scene contains primitives whose textures include punch through, the final rendered pixel value at a pixel position may be determined by primitives other than the primitive with the smallest depth value at that pixel position.

FIG. 1 shows a graphics processing system 100 comprising a processing module 102 which may be referred to as an Image Synthesis Processor (ISP), a depth buffer 104 which may be referred to as a Z-buffer, a tag sorter module 106, a texturing and shading engine 108 which may be referred to as a Unified Shading Cluster (USC), and a pixel buffer 110. In operation, primitives (e.g. vertex coordinates and primitive identifiers) are received at the ISP 102, and the ISP performs HSR on the primitives to determine which primitives are visible at each of a plurality of sample positions of the image to be rendered. In order to implement the HSR for a typical render, the ISP is programmed to store in depth buffer 104, for each sample position, a depth value representing the depth of the closest primitive which has been processed so far by the ISP 102, such that the ISP 102 can compare the depth of a primitive currently being processed with the depth values stored in the depth buffer 104 to determine whether the current primitive is visible. The results of the HSR performed by the ISP 102 are used to update the depth values stored in the depth buffer 104 accordingly. It is noted that in some systems, the depth buffer 104 and tag sorter module 106 may be described as components of the ISP 102.

The tag sorter module 106 comprises a tag buffer which is configured to store, for each sample position, a primitive identifier (ID) of a visible primitive at that sample position as determined by the HSR performed by the ISP 102. The tag sorter module 106 also comprises a controller to control the updating and flushing of the tag buffer. Primitive identifiers are flushed to the USC 108. In response to receiving the flushed primitive identifiers, the USC 108 will retrieve the identified primitives and will retrieve texture data in order to apply texturing and shading to the primitives identified by the flushed primitive IDs. The controller in the tag sorter module 106 controls when primitive identifiers are flushed to the USC 108. For example, primitive identifiers may be flushed to the USC 108 when the primitives for the image have all been processed by the ISP 102. Primitive identifiers may also be flushed to the USC 108 when primitive identifiers of translucent primitives, or primitives with texturing that includes punch through, are to be stored in the tag buffer. This is so that these primitives can be properly blended.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a graphics processing system having a rendering space comprising one or more tiles, the graphics processing system comprising: a processing module configured to receive primitives to be processed for a tile, wherein the processing module is configured to perform hidden surface removal for primitives of the tile to determine primitive identifiers identifying the primitives which are visible at each of a plurality of sample positions in the tile; a set of two or more tag buffers configured to store the primitive identifiers determined for each of the sample positions in the tile, wherein primitive identifiers stored at corresponding sample positions in the tag buffers of the set represent overlapping layers of primitives; a tag control module configured to control: (i) selection of a tag buffer for the storage of each of the primitive identifiers identifying primitives which are determined to be visible by the hidden surface removal, wherein the selection of a tag buffer is made for a block of one or more sample positions according to the layering of the primitives identified by the primitive identifiers stored in the tag buffers at the one or more sample positions in the block, and (ii) flushing of primitive identifiers from one or more of the set of tag buffers; and a texturing engine configured to receive flushed primitive identifiers and to apply texturing to the primitives identified by the flushed primitive identifiers.

There is also provided a method of processing primitives in a graphics processing system having a rendering space comprising one or more tiles, the method comprising: performing hidden surface removal for primitives of a tile to determine primitive identifiers identifying the primitives which are visible at each of a plurality of sample positions in the tile; selecting a tag buffer from a set of two or more tag buffers for the storage of each of the primitive identifiers identifying primitives which are determined to be visible by the hidden surface removal, wherein primitive identifiers stored at corresponding sample positions in the tag buffers of the set represent overlapping layers of primitives, and wherein the selection of a tag buffer is made for a block of one or more sample positions according to the layering of the primitives identified by the primitive identifiers stored in the tag buffers at the one or more sample positions in the block; storing the primitive identifiers determined to be visible by the hidden surface removal for each of the sample positions in the corresponding selected tag buffers; flushing primitive identifiers from one or more of the set of tag buffers; and applying texturing to the primitives identified by the flushed primitive identifiers.

There is also provided computer readable code adapted to perform the steps of any of the methods of the examples described herein when the code is run on a computer. Furthermore, there may be provided computer readable code for generating any of the graphics processing systems of the examples described herein. The computer readable code may be encoded on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 5b shows corresponding columns of a plurality of tag buffers storing primitive identifiers for the primitives shown in FIG. 5a;

FIG. 5c is a diagram showing primitives which are visible in a tile in a second example;

FIG. 5d shows corresponding columns of a plurality of tag buffers storing primitive identifiers for the primitives shown in FIG. 5c;

Figure 1:
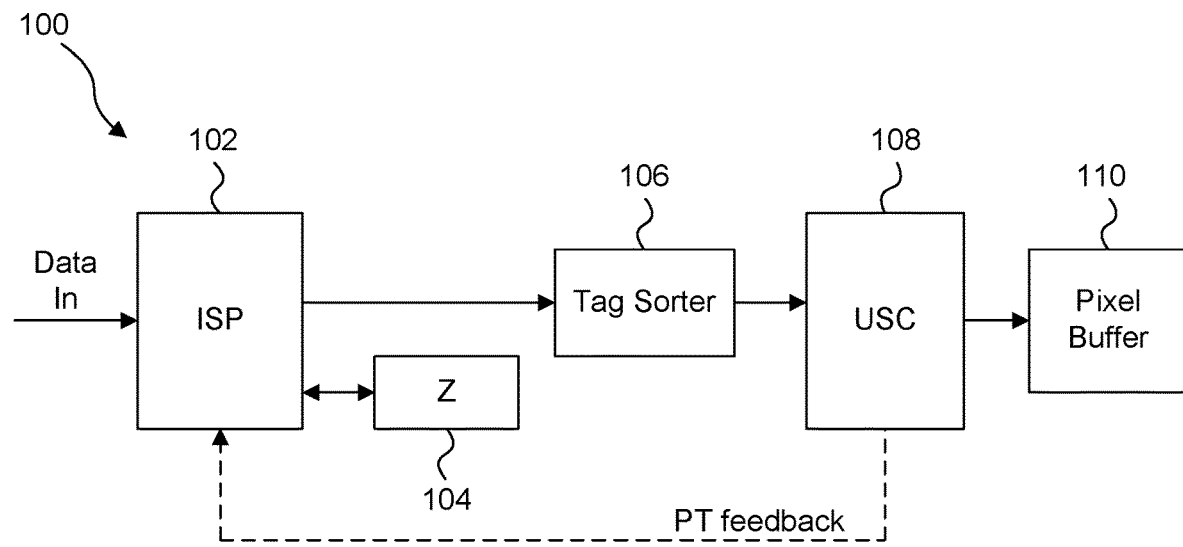
FIG. 1 is a schematic diagram of a graphics processing system.

The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The graphics processing system 100 described in the background section above is efficient because hidden surface removal is performed in the ISP 102, and only visible surfaces are sent for texturing and shading at the USC 108. Systems that perform texturing and shading before hidden surface removal may be less efficient because the work done in texturing and shading an object is wasted if that object is later hidden by other objects in the scene.

The system of FIG. 1 is most efficient when processing only opaque primitives, when hidden surface removal may be completed for a whole scene, or part of a scene, before texturing and shading begins. The primitive IDs of the opaque objects are collected by the tag sorter 106, such that when every opaque primitive has been processed by the ISP 102, the tag buffer stores an identifier for the primitive visible at each sample position. The tag buffer may then be flushed, sending the primitive IDs to the USC 108 such that the corresponding identified primitives may be textured and shaded. The tag sorter 106 is so-called because primitive IDs may be grouped, or sorted, as they are flushed from the buffer, such that, wherever possible, the USC 108 is able to process IDs from a single primitive, or from primitives with similar texturing and shading requirements, as a group. Sorting the primitive IDs may therefore lead to improved cache performance in the USC 108. When a scene consists only of opaque primitives, the tag buffer need only be flushed once.

The system of FIG. 1 encounters problems in some situations, such as when a scene contains translucent or punch through primitives.

Translucency means that light is able to pass through objects. When rendering translucent objects it is no longer sufficient to render only the primitives with the smallest depth value, since it may be necessary to see through those primitives to the primitives behind. The colour of a pixel in the rendered image may be formed by blending the colour of a translucent primitive with the colour of one or more other primitives. Typically, the rendered image is built up by blending layers of translucent objects, starting with the primitives with the greatest depth value, and ending with the primitives with the smallest depth value. Not all rendering systems are capable of sorting translucent objects, so it is often left to the software application (e.g. a game) to present the primitives pre-sorted into a back to front order. In one example of translucency processing, translucent primitives are processed in the ISP 102 (for example to determine if they are hidden behind existing opaque objects at any sample positions), and the tag buffer is flushed after each translucent primitive, such that the primitive can be textured and shaded, and blended with previously textured and shaded primitives in pixel buffer 110. If the application sends further opaque primitives after the translucent primitives, the results of the blending may be hidden.

Punch through refers to a rendering technique where a texture may be used to add holes to otherwise opaque primitives. Holes in a primitive should not result in the ISP 102 updating depth buffer 104, but the system of FIG. 1 only evaluates the textures, and therefore determines where the holes are, in the USC 108. The system of FIG. 1 must therefore take some additional steps to render punch through objects. In an example of punch through processing, a punch through primitive arriving at ISP 102 is sampled, and may be tested against depth buffer 104 to determine any parts that are hidden behind existing opaque objects. Any parts of the punch through object that are not hidden are sent to the tag sorter 106, but depth buffer 104 is not updated. The tag buffer is flushed immediately, which may involve flushing any existing contents of the tag buffer, then sending the punch through primitive to the USC 108. The USC 108 performs at least the texturing and shading operations required to determine whether any parts of the primitive have holes, and returns the opaque parts to the ISP 102 through the path labelled "PT Feedback" that is shown with a dotted line in FIG. 1. The ISP 102 performs another depth test, since the state of depth buffer 104 may have changed in the time taken to texture and shade the punch through primitive, and any parts of the primitive that remain visible are stored as primitive IDs in the tag buffer. When the primitive ID is eventually flushed to the USC 108 for the second time, the remainder of the texturing and shading is performed, and image pixels are stored in pixel buffer 110.

Flushing the primitive identifiers for translucent or punch through primitives as described above may be inefficient because some of the flushed primitive identifiers may relate to primitives which are subsequently hidden by other primitives that the ISP 102 is yet to process. Furthermore, flushing primitive identifiers whenever translucent primitives or primitives with punch through textures are processed may result in many flushes being performed (e.g. with each flush including a small number of primitive identifiers). It is often less efficient to perform lots of small flushes compared to performing fewer larger flushes of primitive identifiers to the USC 108.

Furthermore, in a graphics processing system in which a rendering space is subdivided into a plurality of regions, or "tiles", which are processed independently, the ISP 102 processes primitives for a tile at a time in the graphics processing system 100 shown in FIG. 1. When the ISP 102 has processed the primitives for one tile (e.g. by performing HSR for the primitives of the tile) it can then start to process the primitives of a next tile. The depth buffer 104 stores depth values for each sample position within a tile that the ISP 102 is currently processing; and the tag buffer in the tag sorter module 106 stores primitive identifiers for each sample position within the tile that the ISP 102 is currently processing. The graphics processing system 100 shown in FIG. 1 is therefore constrained to processing primitives for tiles, a tile at a time, such that all of the primitives of a tile are processed before primitives of the next tile are processed. That is, the tiles are processed in a serial manner, i.e. in sequence.

Embodiments will now be described by way of example only.

Figure 2:
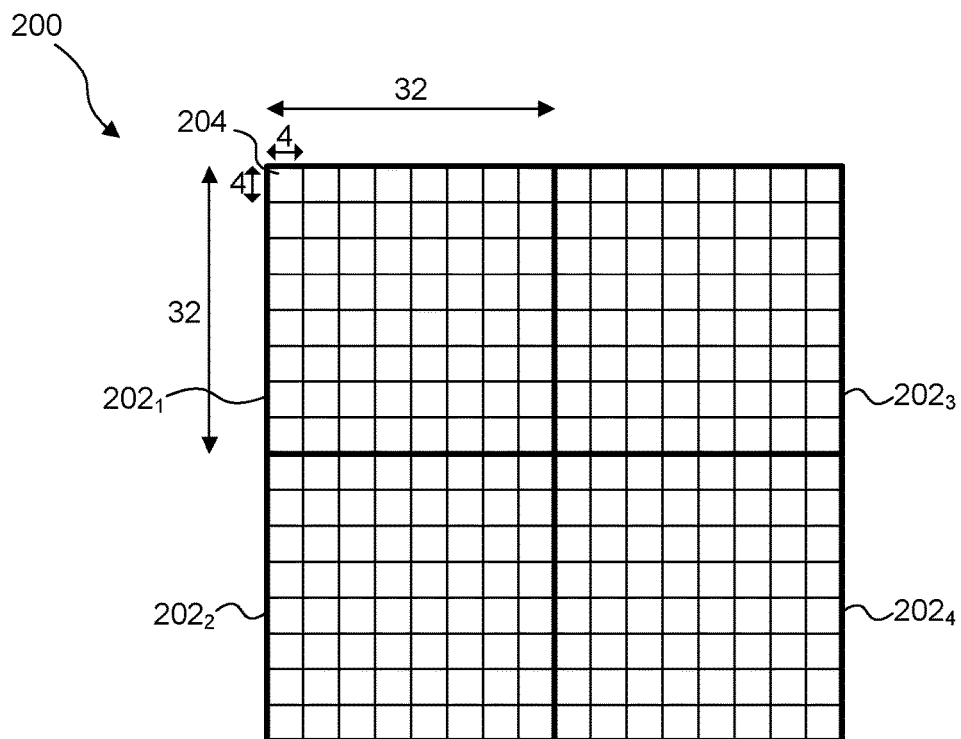
FIG. 2 represents four tiles of a rendering space.

As indicated above, a graphics processing system may have a rendering space which is subdivided into a plurality of tiles, which are processed independently. FIG. 2 shows four tiles $202_1$ to $202_4$ of a rendering space 200 which is used for rendering an image. The rendering space 200 may include more than four tiles (or fewer than four tiles), but for clarity only four tiles are shown in FIG. 2. As indicated in FIG. 2, each of the tiles in this example has a size of 32×32 sample positions. A sample position represents a position of the rendered image, and may or may not correspond to the actual pixel positions of the final image, whereby the pixel positions are the positions for which pixel values are determined and stored in a pixel buffer for representing an image. The primitives are sampled at each sample position to create "fragments" which are then processed, for example by hidden surface removal, texturing, and shading, in the rest of the rendering system. In some examples there may be more sample positions than pixel positions which allows the processing of the primitives to be performed at a finer granularity than the granularity of the pixels of the final image. This can be useful for using anti-aliasing techniques to reduce the appearance of jagged edges in the rendered image. As shown in FIG. 2, each tile is further subdivided into microtiles 204 which in this example have a size of 4×4 sample positions. The use of the microtiles is explained further in the examples described below. It is noted that in other examples the tiles and microtiles may have different sizes and/or shapes to those in the example shown in FIG. 2.

Figure 3:
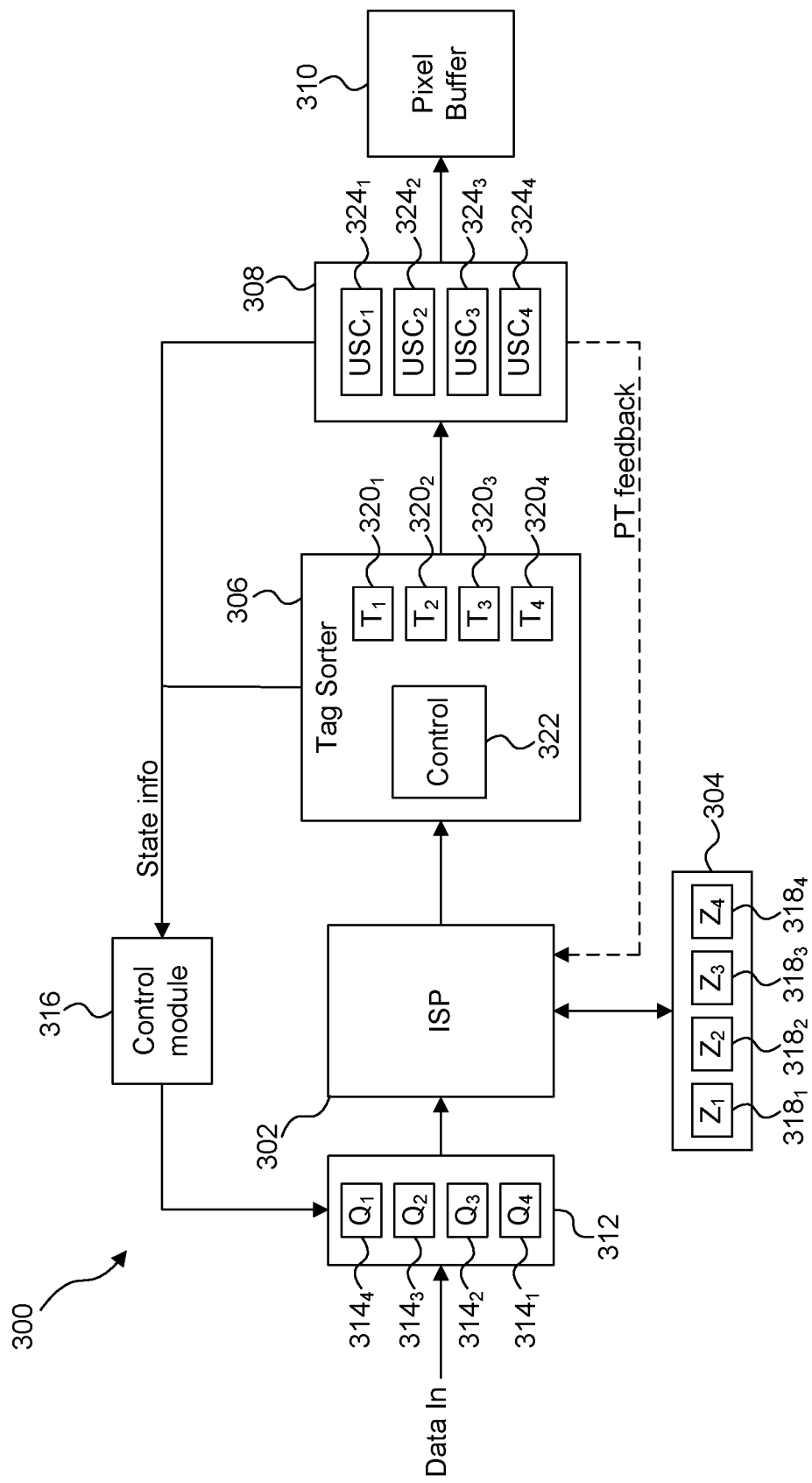
FIG. 3 is a schematic diagram of a graphics processing system implementing a plurality of depth buffers.

FIG. 3 shows a graphics processing system 300 which is configured to allow the processing of primitives to switch between primitives of different tiles before all of the primitives of a particular tile have finished being processed. In this sense the graphics processing system 300 can have "multiple tiles in flight", i.e. multiple tiles for which the primitives are partially processed at a given time. In order to achieve this the graphics processing system 300 comprises a processing module 302, a depth buffer block 304, a tag sorter module 306, a texturing unit 308, a pixel buffer 310, and a control module 316. This example also includes a block of queues 312. In the example shown in FIG. 3, the block of queues 312 comprises four queues $314_1$ to $314_4$; the depth buffer block 304 comprises four depth buffers $318_1$ to $318_4$; the tag sorter module 306 comprises four tag buffers $320_1$ to $320_4$ and a tag control module 322; and the texturing unit 308 comprises four texturing engines $324_1$ to $324_4$. The elements of the graphics processing system 300 shown in FIG. 3 may be implemented in hardware, software or a combination thereof.

Figure 4:
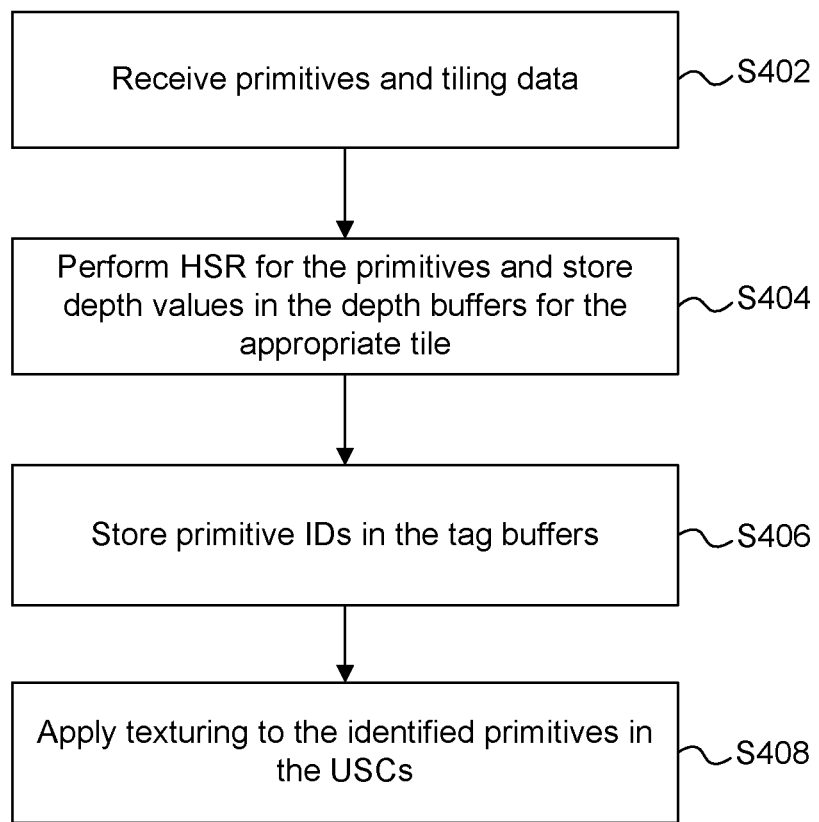
FIG. 4 is a flow chart for a method of processing primitives in the graphics processing system shown in FIG. 3.

The operation of the graphics processing system 300 is described with reference to the flow chart shown in FIG. 4. Primitives of different tiles are received at the block of queues 312 of the graphics processing system 300. The primitives may relate to objects of a scene to be rendered, and may for example be sent to the graphics processing system 300 from an application (e.g. a game) running on the same device (e.g. a mobile user device) as the graphics processing system 300. The primitives are associated with tiling data which indicates one or more tiles 202 in which the primitives will be processed. The tiling data may have been determined in a previous operation of determining which tiles the primitives are present in, which is not described in detail herein. Each of the primitives is described by primitive data which includes an indication of the positions of the vertices of the primitive, and may include other information such as an indication of a texture to be applied to the primitive. Each of the queues $314_1$ to $314_4$ is configured to store the primitives for a respective tile at a time. In the examples described herein, the tiling data indicates which tile each primitive is for. In the examples described above, since a queue is associated with a tile at a time, the tiling data associated with the primitives does not need to be, and is not, stored in the queues to indicate which tile each primitive is for. However, in some other examples, the tiling data may be stored in the queues with the primitives. The queues 314 may for example be implemented as First In First Out (FIFO) buffers. The graphics processing system 300 shown in FIG. 3 can have up to four tiles in flight at a given time. In some examples there may be a different number of queues in the block 312, and in some examples there might not be any queues and the primitives and tiling data may be received directly at the processing module 302 without first storing the primitives and tiling data in any queues as shown in FIG. 3.

In step S402 the processing module 302 receives primitives and the associated tiling data. The tiling data identifies the tile or tiles in which the primitive will be processed, and should identify at least one of the tiles to which the resources (e.g. the depth and tag buffers) of the processing module 302 are currently assigned. In the example shown in FIG. 3 the primitives and tiling data are received at the processing module 302 from one of the queues $314_1$ to $314_4$. Since each of the queues $314_1$ to $314_4$ is configured to store the primitives for a respective tile at a time, the tiling data may simply comprise the identity of the queue from which the primitive is received.

In step S404 the processing module 302 performs hidden surface removal (HSR) for a primitive of a tile by comparing depth values for that primitive with depth values stored in the depth buffer associated with the tile. Each of the depth buffers $318_1$ to $318_4$ is configured to be associated with one tile at a time and configured to store a depth value for each sample position within the respective associated tile. For example, the four depth buffers $318_1$ to $318_4$ may be associated with four tiles (tile A to tile D) respectively. The four tiles with which the depth buffers are associated may be selected from any position on the rendering surface. There is no requirement that the tiles be adjacent to each other. In some examples, tiles may be selected from positions in more than one rendering surface.

The HSR performed by the processing module 302 for a primitive comprises determining which sample positions lie within the primitives (based on the vertex positions of the primitives), and performing depth tests at these sample positions based on the depth values stored in the relevant depth buffer 318.

As part of step S404 the processing module 302 may update one or more of the depth values stored in the depth buffer 318 associated with the tile that is currently being processed.

The processing module 302 has a processing unit which operates on one primitive at a time. However, since the graphics processing system 300 comprises a plurality of depth buffers $318_1$ to $318_4$, it is able to switch between processing primitives from different tiles before finishing the processing of all of the primitives within a tile. That is, the processing module 302 can perform HSR for a primitive of a tile while another one of the depth buffers 318 stores depth values for a partially processed tile. The partially processed tile in this case is a different tile to the tile for which a primitive is currently being processed by the processing module 302. This allows greater flexibility in the order in which the primitives are processed by the processing module 302, which can lead to more efficient processing of the primitives by the graphics processing system 300 compared to the processing performed by the graphics processing system 100 in which all of the primitives of one tile are processed by the processing module 102 before any of the primitives of the next tile are processed by the processing module 102. For example, if the processing of a tile stalls for some reason that is specific to the tile being processed, then the processing module 302 of the graphics processing system 300 can continue to process primitives from other tiles, whereas the processing module 102 of the graphics processing system 100 may be stalled until the processing can resume for the stalled tile. Furthermore, as described below, multiple texturing engines 324 can be implemented, to increase the texturing and shading capability of the system. In previous systems a processing unit with a single depth buffer has been coupled to multiple texturing engines. It was therefore necessary to devise a system to supply fragments to each texturing engine, in such a way that the loading of the texturing engines is kept reasonably well balanced, and so that the efficiency of caches, etc., is maintained. In practice this is difficult to achieve.

In the present system, where there are multiple tiles in flight, it can be efficient to use the same texturing engine 324 for applying texturing to all of the visible primitives within a particular tile. That is, each texturing engine 324 can be associated with a respective tile.

This association can be beneficial because each primitive in a tile causes texturing data for that primitive to be loaded into the local caches of the texturing engine 324. By processing a primitive's fragments in a single texturing engine 324, the primitive's texturing data is loaded only into the caches of that texturing engine. In contrast, if the primitive's fragments were distributed to several texturing engines, the same texturing data would be duplicated in several caches. By avoiding duplication of data, the efficiency of the caches is improved. The arrangement is also beneficial in that the loading of the texturing engines 324 can be more easily balanced, for example by associating each texturing engine 324 with a different one of the multiple tiles in flight, rather than by attempting to evenly distribute the fragments from one tile to several texturing engines. Load balancing is described in more detail below.

In step S406 primitive identifiers for the fragments which survive the hidden surface removal of step S404 are stored in the tag buffers 320, such that, after each primitive has been processed, the tag buffers contain the identity of the primitive that is visible at each sample location. In the example shown in FIG. 3, there are four tag buffers ($320_1$ to $320_4$) in the tag sorter module 306, which is the same as the number of depth buffers 318, such that each of the tag buffers $320_1$ to $320_4$ is dynamically associated with a respective particular tile. That is, each of the tag buffers 320 stores the primitive identifiers identifying the primitives determined by the HSR to be visible at each sample position within a respective tile. In general, for each of the tiles that may be "in flight" there is an associated set of at least one tag buffer 320 configured to store the primitive identifiers for the visible primitives of that tile. In the example shown in FIG. 3 all of the "sets of tag buffers" which are associated with particular tiles include just one tag buffer 320, but as is described in more detail below with reference to FIGS. 6 and 8 these sets may include more than one tag buffer.

The tag control module 322 of the tag sorter module 306 controls the selection of one of the tag buffers 320 for storage of each of the primitive identifiers received at the tag sorter module 306 as the output of the HSR performed by the processing module 302. The tag control module 322 also controls the flushing of primitive identifiers from the tag buffers $320_1$ to $320_4$. The flushed primitive identifiers are passed to the texturing unit 308. The operation of the tag sorter module 306 is described below in more detail in relation to FIGS. 5a to 9b.

In step S408 one of the texturing engines $324_1$ to $324_4$ applies texturing and shading to the primitives identified by the flushed primitive identifiers. A texturing engine 324 retrieves texture data and the identified primitives (e.g. from a memory) and applies the texture data to the primitives identified by the flushed primitive identifiers. In the example shown in FIG. 3 there are four texturing engines $324_1$ to $324_4$, i.e. there are the same number of texturing engines 324 as there are depth buffers 318. In this case each of the texturing engines is associated with a respective tile such that all of the texturing that is applied to the primitives of a particular tile is performed by the same texturing engine 308. That is, the primitive identifiers in the tag buffer(s) 320 associated with a particular tile are all sent to the same ones of the texturing engines 324, such that all of the texturing that is applied to the visible primitives of the particular tile is applied by the same texturing engine 324. As described above, this may improve the efficiency of texturing the primitives in the case that there are multiple tiles in flight. Methods for applying texturing to primitives are known in the art, and as such the texturing process is not described in great detail herein.

The result of applying the texturing to the primitives at the texturing unit 308 is a set of pixel values for the image. The texturing unit 308 may comprise some logic for converting sample values to pixel values where the samples do not exactly correspond to the pixels (e.g. where there are more samples than pixels). The pixel values are output from the texturing unit 308 and stored in the pixel buffer 310. The pixel buffer 310 stores the pixel values of the image which can then be used in any suitable manner, e.g. output to a display or stored in a memory or transmitted to another device, etc.

The control module 316 controls which primitives are processed by the processing module 302 to thereby control the switching of the processing module 302 between processing primitives for different tiles. In order to control the switching of the processing module 302, the control module 316 may send a control signal to the block of queues 312, thereby selecting one of the queues 314. Alternatively, the control module 316 may send a control signal to the processing module 302 indicating which of the queues 314 the processing module 302 should read from. The control module 316 may manage the flow control in different ways and the two methods suggested above are given by way of example only. A primitive from the selected queue 314 is sent to the processing module 302. The primitive's associated tiling data is also sent to the processing module 302, such that the primitive can be processed as described above. As shown in FIG. 3, the control module 316 may receive state information which describes the state of the graphics processing system 300. The selection of the one of the queues 314 by the control module 316 may be based on the state information. The state information may be any suitable information relating to the state of the graphics processing system 300 which may be useful for the control module 316 in determining whether to switch the processing of the processing module 302 in order to process primitives of a different tile.

For example, the control module 316 may receive state information from the texturing unit 308 indicating that one of the texturing engines 324 is idle or is about to become idle. In this case, the control module 316 may prioritise the processing of primitives for the tile currently associated with the indicated texturing engine 324. This is useful in order to balance the processing load across the different texturing engines 324, e.g. thereby avoiding, if appropriate, a situation in which one of the texturing engines 324 is not being utilised to the greatest extent possible. In one example the state information received by control module 316 comprises information about the state of buffers (e.g. FIFOs) at the interfaces between tag buffers 320 and texturing engines 324. A tag buffer 320 may flush many primitive identifiers at one time, and a texturing engine 324 may process them one at a time, or in small groups. The texturing engines may therefore buffer a number of primitive identifiers until they can be scheduled for execution by the texturing engine. When the number of buffered primitive identifiers falls to zero the texturing engine has no more work to do, and becomes idle. Control module 316 may prioritise the processing of primitives in an attempt to ensure that the buffers never, or rarely, become empty. "Prioritising" the processing of primitives for a tile may mean increasing the frequency with which the primitives for that tile are selected to be processed by the processing module 302, or, as described below, preferentially selecting a tag buffer associated with that tile, when it is necessary to perform a flush.

As another example, the control module 316 may receive state information, e.g. from the tiling process, indicating that there is a large quantity of data (e.g. many layers of primitives) to process in a tile. In this case, the control module 316 may be configured to prioritise the processing of primitives for the tile by ensuring that a queue 314 is assigned to that tile at an early opportunity. By doing this, the system ensures that other tiles are able to be processed simultaneously, thereby increasing the utilisation of the texturing engines.

As another example, the control module 316 may receive state information, e.g. from the texturing unit 308 or the tag sorter module 306, indicating that the processing of a tile has stalled, e.g. because it is waiting for a response to a memory access request to an off-chip memory. In this case, the control module 316 is configured to deprioritise the processing of primitives for the stalled tile. "Deprioritising" the processing of primitives for a tile may mean reducing the frequency with which the primitives for that tile are selected to be processed by the processing module 302. The state information may include more than one of the indications described above and in this case the effects of the different prioritisations/deprioritisations can be combined in order to determine which of the tiles should be selected.

Other example graphics processing systems might not include a control module 316, and the selection of which of the primitives should be processed by the processing module 302 may be determined in a different manner. For example, one of the queues 314 could be selected periodically at random to provide a primitive to the processing module 302 when the processing module 302 is ready to receive a new primitive. Alternatively, the queues 314 could each be selected in turn in some pattern, e.g. according to a round robin scheme.

It can therefore be appreciated that the graphics processing system 300 allows multiple tiles to be "in flight" wherein the processing module 302 can perform HSR for primitives for one tile using one of the depth buffers 318 while depth values for a different, partially processed tile are stored in a different one of the depth buffers 318.

There can be a situation in which many primitives are present at a particular sample position within a tile, such that the primitives are overlapping. An example of such a situation is shown in FIG. 5*a* which, for clarity, shows a small tile 500, which is divided into an 8×8 grid. In this example, each grid square corresponds to a screen pixel and has a sample position, typically at its centre. As described above, different tile configurations and sampling patterns are possible. FIG. 5*a* shows that there is a primitive 502 which covers the whole of the tile 500, and may for example represent a background in the image. In front of the primitive 502 (i.e. closer to the viewpoint, and therefore represented, in this example, by smaller "depth" values) there are two further primitives 504 and 506 which do not overlap with each other. It can be seen in FIG. 5*a* that the primitive 504 does not extend outside of the tile 500, whereas the primitive 506 extends outside the tile 500, e.g. into another tile (not shown in FIG. 5*a*) which is positioned below the tile 500. In front of the primitives 502, 504 and 506 is another primitive 508. Further, in front of the primitive 508 is a further primitive 510. If the primitives are completely opaque then the final sample values will be determined by the closest primitive at each of the sample positions. If some of the primitives are not fully opaque (e.g. they have some translucency or have textures which include punch through) then the final sample values may be determined by a blend of more than one of the primitives at the sample positions.

As described above, if just one tag buffer is used to store primitive identifiers for primitives within a tile then when hidden surface removal is performed for a primitive which is not fully opaque then the primitive identifiers that are already in the tag buffer will be flushed to allow the newly processed primitive identifier to be stored in the tag buffer.

Figure 6:
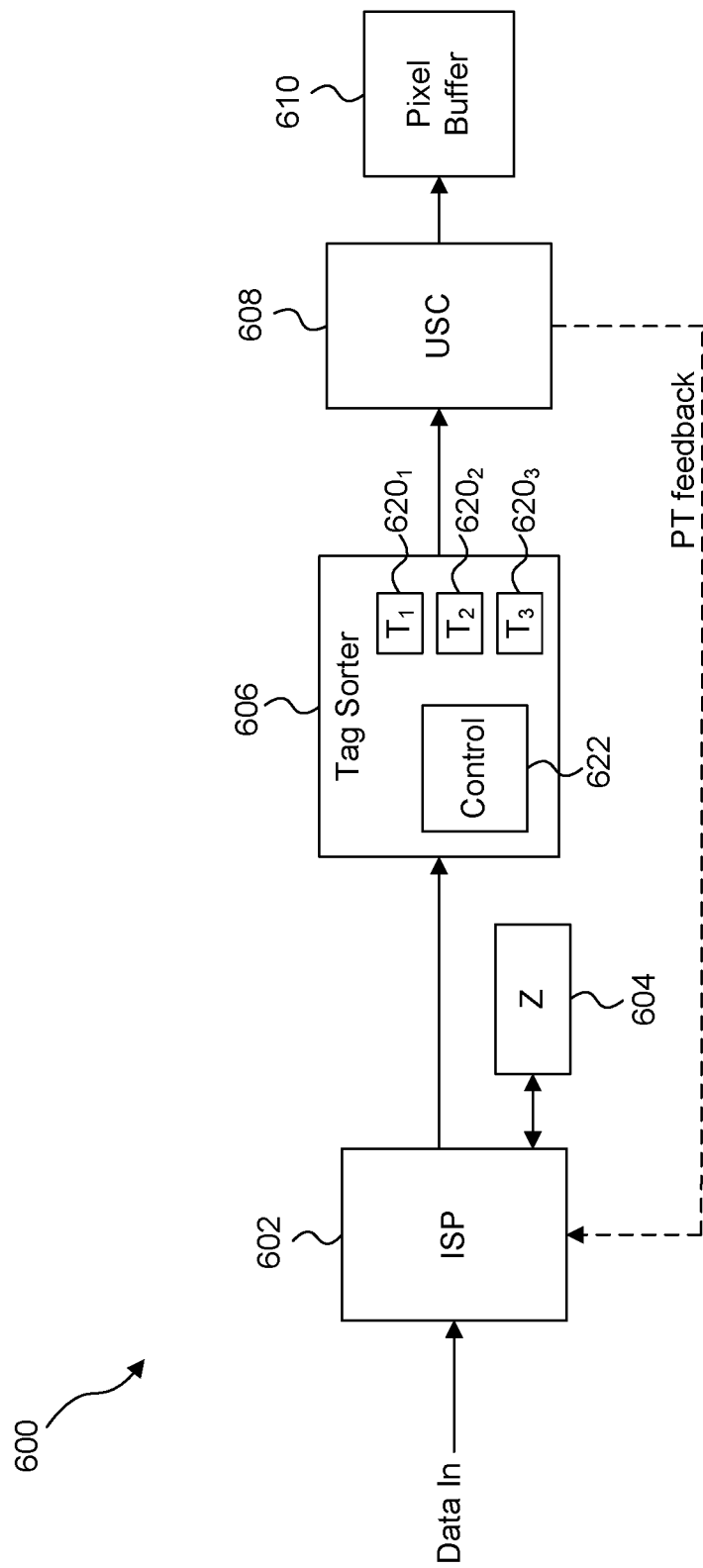
FIG. 6 is a schematic diagram of a graphics processing system implementing a plurality of tag buffers.

This results in a large number of separate flushing operations, which may be less efficient than performing fewer, but larger flushing operations which provides greater opportunity for opaque primitives to hide previously processed primitives, thereby avoiding unnecessary further processing being performed on the previously processed primitives which will ultimately be hidden in the final image. FIG. 6 shows a graphics processing system 600 which can reduce the number of separate flushing operations that are performed. The graphics processing system 600 comprises a processing module 602, a depth buffer 604, a tag sorter module 606, a texturing engine 608 and a pixel buffer 610. In the example shown in FIG. 6, the tag sorter module 606 comprises three tag buffers $620_1$ to $620_3$ and a tag control module 622. The elements of the graphics processing system 600 shown in FIG. 6 may be implemented in hardware, software or a combination thereof.

Figure 7:
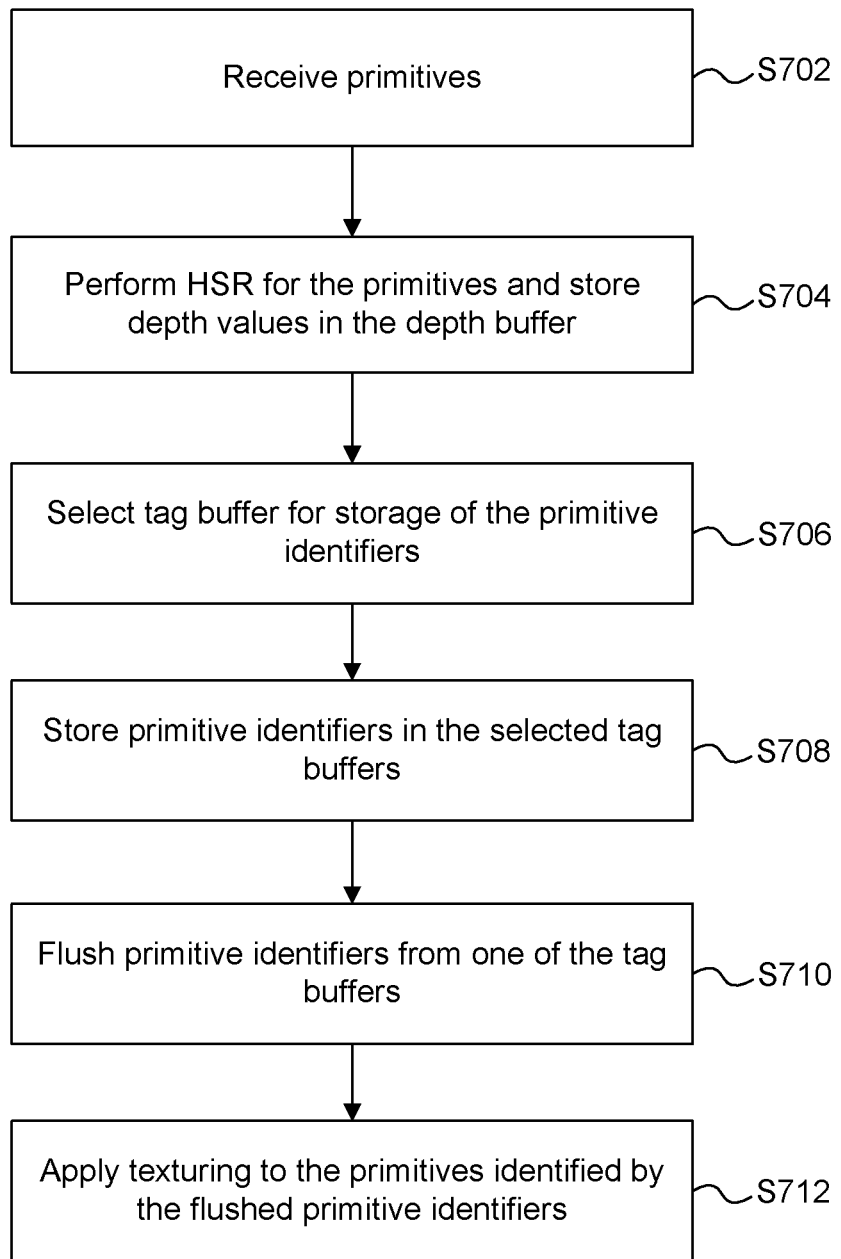
FIG. 7 is a flow chart for a method of processing primitives in the graphics processing system shown in FIG. 6.

The operation of the graphics processing system 600 is described with reference to the flow chart shown in FIG. 7. In step S702 the processing module 602 receives primitives which may relate to objects of a scene to be rendered, and may for example be sent to the graphics processing system 600 from an application (e.g. a game) running on the same device (e.g. a mobile user device) as the graphics processing system 600. In this example the primitives relate to a single tile (e.g. tile 500) in which the primitives will be processed. Unlike the system of FIG. 3, the system of FIG. 6 does not support "multiple tiles in flight". It is therefore not necessary for the processing module 602 to receive tiling data indicating which one of several tiles the primitive should be processed in. Although the graphics processing system 600 is described as having a rendering space which is subdivided into a plurality of tiles, it is noted that the use of multiple tag buffers to allow for the storage of overlapping layers of primitive identifiers in the tag sorter module 606 can be used in other examples which may not have a rendering space which is divided into multiple tiles, i.e. which have only one tile.

In step S704 the processing module 602 performs hidden surface removal (HSR) for a primitive of the tile 500 by comparing depth values for that primitive with depth values stored in the depth buffer 604. The HSR performed by the processing module 602 for a primitive may for example comprise determining which sample positions lie within the primitives (based on the vertex positions of the primitives), and performing depth tests at these sample positions based on the depth values stored in the depth buffer 604. In this way, the HSR determines primitive identifiers identifying the primitives which are visible at each of the sample positions in the tile 500. As part of step S704 the processing module 602 may update one or more of the depth values stored in the depth buffer 604.

The three tag buffers $620_1$ to $620_3$ form a set of tag buffers which are configured to store primitive identifiers for each of the sample positions in the tile, whereby primitive identifiers stored at corresponding sample positions in the tag buffers 620 of the set represent overlapping layers of primitives.

In step S706 the tag control module 622 selects one of the tag buffers 620 for the storage of each of the primitive identifiers output from the processing module 602 which identify primitives which are determined to be visible by the hidden surface removal. In one example a tag buffer 620 is selected independently for each sample position at which the primitive is determined to be visible according to the primitive identifiers already stored in the tag buffers 620 at each sample position. In another example, processing module 602 performs hidden surface removal for a primitive at each sample position in a microtile. A microtile is a group of sample positions, typically 4×4, for which hidden surface removal for a primitive may be performed in parallel. In this case it may be appropriate to select one tag buffer to store all the primitive identifiers for the fragments of a primitive determined to be visible in the microtile. In a third example, one tag buffer is selected to store the primitive identifiers for all the fragments of a primitive determined to be visible in the tile, whilst another tag buffer may be selected to store the primitive identifiers for all the fragments of another primitive determined to be visible in the tile. Therefore, in the third example, the selection of a tag buffer for storing the primitive identifiers of a primitive is performed at the scale of whole tiles, rather than at the scale of microtiles or at the scale of individual samples.

In step S708 the primitive identifiers for the fragments which are determined to be visible by the HSR for each of the sample positions are stored in the corresponding selected tag buffer(s).

Figure 5B:
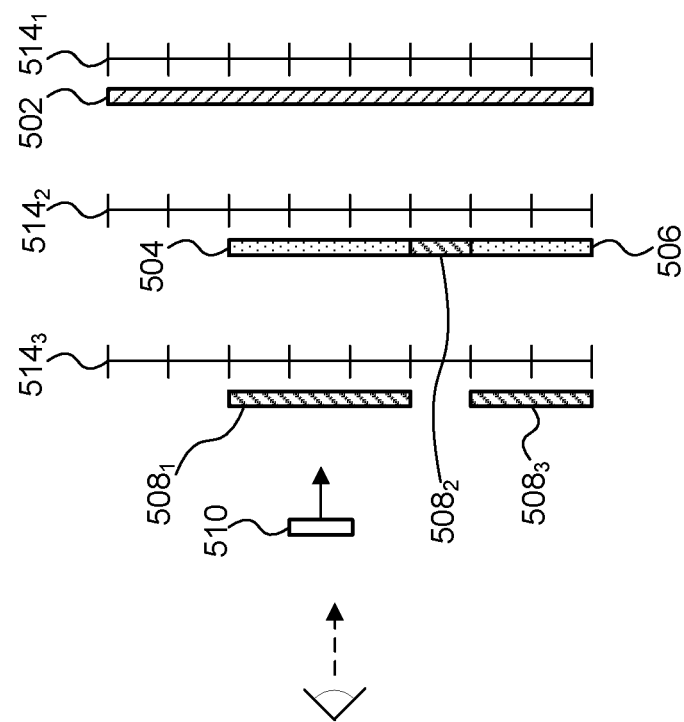
Figure 5A:
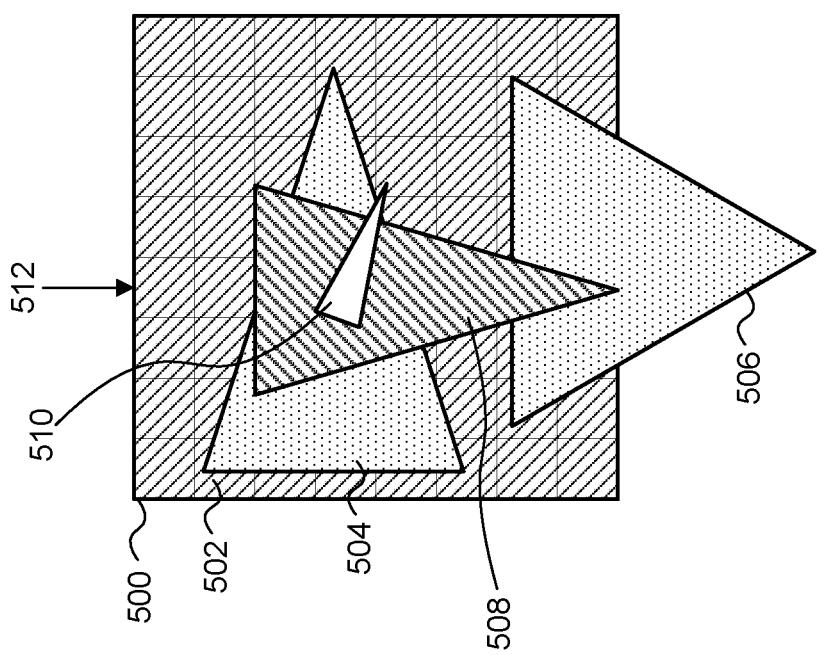
FIG. 5a is a diagram showing primitives which are visible in a tile in a first example.

FIGS. 5a and 5b illustrate the example in which a tag buffer is selected independently for each sample position. With reference to FIG. 5a, one of the columns of sample positions is indicated by the arrow 512. As an example, primitive 502 is opaque, whereas the other primitives in the tile 500 (primitives 504, 506, 508 and 510) are all translucent. FIG. 5b shows a column $514_1$ of tag buffer $620_1$, a column $514_2$ of tag buffer $620_2$ and a column $514_3$ of tag buffer $620_3$. Each of the columns $514_1$ to $514_3$ are configured to store primitive identifiers for the primitives shown in the column 512 shown in FIG. 5a. It can be appreciated that the primitives 502 to 510 overlap at some of the sample positions within the column 512. FIG. 5b shows the viewpoint on the left of the figure, such that it can be seen that in the example shown in FIG. 5b, for each sample position, the column $514_1$ of the tag buffer $620_1$ is configured to store primitive identifiers for primitives which are further away than overlapping primitives for which the column $514_2$ of the tag buffer $620_2$ is configured to store primitive identifiers, which themselves are further away than overlapping primitives for which the column $514_3$ of the tag buffer $620_3$ is configured to store primitive identifiers. In this way, the tag buffers 620 represent overlapping layers of primitives at different sample positions.

In an example, the primitive identifier for the primitive 502 is received at the tag sorter module 606 before the primitive identifiers for the other primitives shown in FIG. 5a. The primitive 502 is opaque and covers all of the sample positions of tile 500. As such it will hide any primitives which may have previously been received for the tile 502 which are further away, e.g. which have larger depth values, than the primitive 502 (it is noted that in other examples the depth values may be defined such that primitives which are further away have smaller depth values). The primitive identifier for primitive 502 can therefore be stored in the tag buffer $620_1$ at all of the sample positions. Therefore the tag control module 622 selects the tag buffer $620_1$, which in this example is the one of the tag buffers 620 which stores primitive identifiers for the furthest layer of the primitives. This is shown in FIG. 5b in that the primitive identifiers are stored for the primitive 502 in the column $514_1$ of the tag buffer $620_1$. The tag sorter module 606 may then receive primitive identifiers for the next primitive 504 (which is translucent) and it will determine that the tag buffer $620_1$ is full at the sample positions covered by the primitive 504, and will therefore select the next layer, i.e. buffer $620_2$, to store the primitive identifiers for the primitive 504. This is shown in FIG. 5b in that primitive identifiers are stored for the primitive 504 in the column $514_2$ of the tag buffer $620_2$.

The tag sorter module 606 may then receive primitive identifiers for the next primitive 506 (which is translucent) and it will determine that the tag buffer $620_1$ is full at the sample positions in the tile 500 covered by the primitive 506, and will therefore select the next layer, i.e. buffer $620_2$, to store the primitive identifiers for the primitive 506 which are in the tile 500. It is noted that the primitive 506 does not overlap the primitive 504 and as such the primitive identifiers for the primitives 504 and 506 can be stored in the same tag buffer $620_2$. This is shown in FIG. 5b in that primitive identifiers are stored for the primitive 506 in the column $514_2$ of the tag buffer $620_2$.

The tag sorter module 606 may then receive primitive identifiers for the next primitive 508 (which is translucent) and it will determine that the tag buffer $620_1$ is full at all of the sample positions covered by the primitive 508. For some of the sample positions of the primitive 508 the tag buffer $620_2$ is available but for some other sample positions of the primitive 508 the tag buffer $620_2$ is not available. In the example illustrated in FIG. 5b, the primitive identifier $508_2$ is stored in column $514_2$ of buffer $620_2$ at the locations where space is available. Primitive identifiers $508_1$ and $508_3$ are stored in column $514_3$ of tag buffer $620_3$ at the locations where space in tag buffer $620_2$ is not available. That is, the tag control module 622 selects the tag buffer 620 for storing primitive identifiers on a per-sample position basis.

The tag sorter module 606 may then receive primitive identifiers for the next primitive 510 (which is translucent) and it will determine that, for the column 512, none of the tag buffers $620_1$, $620_2$ and $620_3$ are available at the sample positions covered by the primitive 510. This is represented in FIG. 5b. Therefore, in order to store the primitive identifiers for the primitive 510 in a tag buffer, one of the tag buffers is flushed. That is, in step S710, the primitive identifiers from one or more of the tag buffers 620 are flushed. The tag control module 622 controls the flushing of the tag buffers 620. When primitive identifiers are flushed from a tag buffer 620 they are received at the texturing engine 608. The flushing of a tag buffer 620 will make that tag buffer 620 available such that the primitive identifiers for the primitive 510 can then be stored in the available tag buffer 620.

In another example the tag control module 622 selects a tag buffer 620 for storing all primitive identifiers of a primitive that relate to a particular microtile, such that for each of the microtiles, if all of the sample positions within that microtile are available in a layer then the primitive identifiers for the primitive are stored in the tag buffer corresponding to that layer. However, if it is not the case that all of the sample positions within a microtile are available in the layer then the primitive identifiers for the primitive are stored in the next layer. FIG. 5c shows the same tile 500, column of sample positions 512, and opaque background primitive 502 as in FIG. 5a. FIG. 5d shows columns $514_1$, $514_2$, and $514_3$ of tag buffers $620_1$, $620_2$, and $620_3$ respectively, with column $514_1$ containing primitive identifiers corresponding to primitive 502. Lines 530 and 532 divide the tile 500 into four microtiles, each containing sixteen sample positions. Similarly, line 532 divides the columns 514 into upper and lower parts corresponding to the two microtiles intersected by the column of sample positions 512.

In this example, the tag sorter module 606 may receive primitive identifiers for the primitive 520 (which is translucent). Tag buffer $620_1$ already contains primitive identifiers for opaque primitive 502, so tag control module 622 selects tag buffer $620_2$ to store the primitive identifiers for primitive 520. This is shown in FIG. 5d in that the primitive identifiers are stored for the primitive 520 in the column $514_2$ of the tag buffer $620_2$.

The tag sorter module 606 may then receive primitive identifiers for the next primitive 522 (which is translucent). In this case a portion $522_1$ of the primitive identifiers for the primitive 522 are stored in the column $514_2$ of the tag buffer $620_2$ because all of the sample positions within the relevant microtile are available in the tag buffer $620_2$, whereas portion $522_2$ of the primitive identifiers for the primitive 522 are stored in the column $514_3$ of the tag buffer $620_3$ because it is not the case that all of the sample positions within the relevant microtiles are available in the tag buffer $620_2$. In general, for each microtile, the primitive identifiers of sample positions within the microtile are stored in the furthest layer represented by the tag buffers which is available for all of the sample positions within the microtile. That is, the selection in step S706 comprises selecting the one of the tag buffers 620 that corresponds to the furthest available layer of the overlapping layers for a block of one or more sample positions (i.e. for a microtile). In other examples, for each microtile, the primitive identifiers of sample positions within the microtile are stored in the furthest layer represented by the tag buffers which is available for all of the sample positions covered by the primitive identifiers within the microtile. That is, the selection in step S706 may comprise selecting the one of the tag buffers 620 that corresponds to the furthest available layer of the overlapping layers for the primitive identifiers within a block of one or more sample positions (i.e. for a microtile).

In step S712 the texturing engine 608 applies texturing and shading to the primitives identified by the flushed primitive identifiers. The texturing is performed in the corresponding way to that described above in relation to step S408. That is, the texturing engine 608 retrieves texture data and the identified primitives (e.g. from a memory) and applies the texture data to the primitives identified by the flushed primitive identifiers. As described above, the result of applying the texturing to the primitives at the texturing unit 608 is a set of pixel values for the image. The pixel values are output from the texturing unit 608 and stored in the pixel buffer 610. The pixel buffer 610 stores the pixel values of the image which can then be used in any suitable manner, e.g. output to a display or stored in a memory or transmitted to another device, etc.

In the examples described in detail above, the selection of a tag buffer for the primitive identifiers is performed either for each individual sample position, or on the microtile scale, e.g. for a 4×4 block of sample positions corresponding to a microtile. However, in other examples, the selection of a tag buffer may be performed at other scales, e.g. for blocks of sample positions of different sizes and/or shapes. Choosing a larger scale may help to reduce occurrences of flushing primitives in multiple phases, which may occur when different portions of the primitive identifiers are stored in different layers. However, choosing a larger scale reduces the opportunities to fill in gaps within layers of the tag buffers. Therefore, there is a trade-off to consider when setting the scale of the blocks.

When one of the tag buffers 620 is to be flushed, the tag control module 622 determines which of the tag buffers to flush based on a flushing strategy. For example, the flushing strategy may be that the tag buffer 620 containing primitive identifiers of the furthest layer (e.g. tag buffer $620_1$ in the examples described above) is to be flushed before another tag buffer 620 is flushed. As another example, the flushing strategy may be that the tag buffer containing the most primitive identifiers (i.e. the fullest tag buffer) is to be flushed before another tag buffer is flushed. The tag control module 622 may control the flushing of the primitive identifiers from the tag buffers 620 such that primitive identifiers from only one of the tag buffers 620 are flushed at a time. Alternatively, the tag control module 622 may control the flushing of the primitive identifiers from the tag buffers 620 such that primitive identifiers from multiple tag buffers 620 are flushed simultaneously. Where the correct behaviour of the rendering depends on the order in which primitives are rendered, the flushing strategy should be chosen so as to preserve this. Note that when primitive identifiers are stored in multiple tag buffers, as shown in FIG. 5b and FIG. 5d, the layering reflects the order in which primitive identifiers are received by the tag sorter module 606, rather than the depths of the primitives. Therefore the multiple tag buffers are capable of preserving order.

FIG. 6 shows an example of how the graphics processing system could be arranged, in which there are three tag buffers 620. In other examples there may be two or more than three tag buffers in the graphics processing system which could be configured to store primitive identifiers for different layers of primitives within a tile.

An advantage of using multiple tag buffers 620 to represent overlapping layers of primitives is that sometimes primitive identifiers that are written to a tag buffer may identify primitives which are subsequently found to be hidden by other primitives by the HSR performed by the processing module 602. In that case, the use of multiple tag buffers can reduce the number of primitive identifiers which are flushed to the texturing engine 608. For example, if only one tag buffer was used in the example shown in FIG. 5a then the primitive identifiers for the primitive 502 would have been flushed to the texturing engine in response to the arrival of the primitive identifiers for the translucent primitive 504. If the next primitive to be processed was opaque and in front of the primitives 502 and 504 then primitives 502 and 504 may be wholly or partially hidden and as such the hidden parts of primitives 502 and 504 would not need to be textured. With the use of multiple tag buffers 620, the primitive identifiers for the primitive 502 would not be flushed to the texturing engine 608 in response to the arrival of the primitive identifiers for the primitive 504 at the tag sorter module 606, because the primitive identifiers for the primitive 504 can be written into the second tag buffer $620_2$. Therefore, no flushes have occurred when the primitive identifiers for the opaque primitive covering primitives 502 and 504 is received at the tag sorter module 606. In that case primitive identifiers for the primitives 502 and 504 can be overwritten in the tag buffers $620_1$ and $620_2$ respectively where they are not needed to be textured. In this way, the unnecessary texturing of fragments of primitives which are ultimately hidden by other primitives can be reduced.

The two ideas described above of allowing multiple tiles to be in flight at a given time with the use of multiple depth buffers, and allowing overlapping layers of primitive identifiers to be stored in multiple tag buffers can be combined to provide a very flexible graphics processing system.

Figure 8:
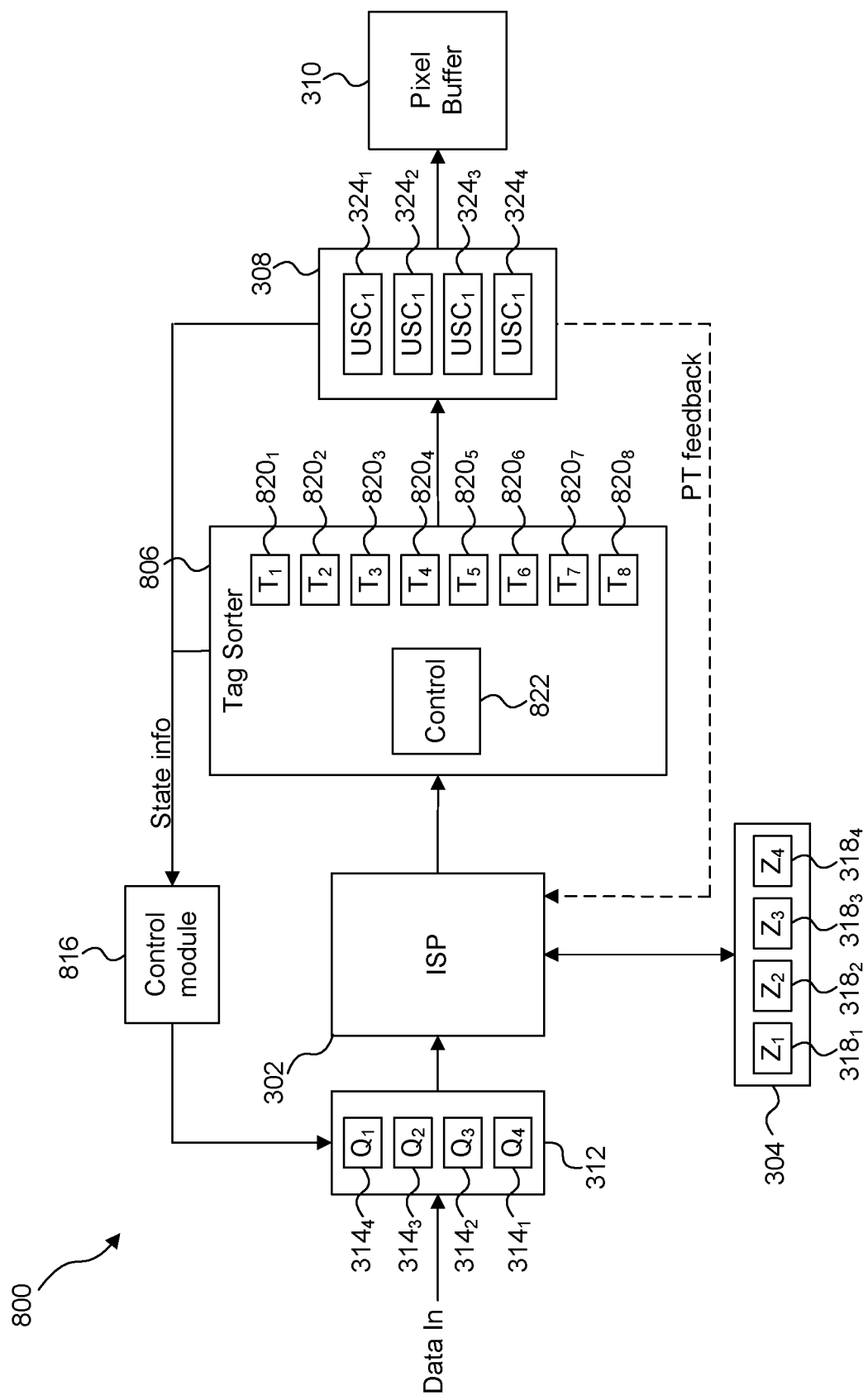
FIG. 8 is a schematic diagram of a graphics processing system implementing a plurality of depth buffers and a plurality of tag buffers.

FIG. 8 shows a graphics processing system 800 which combines features of the graphics processing systems 300 and 600 described above and shown in FIGS. 3 and 6 respectively. In particular, the graphics processing system 800 includes some of the same elements as the graphics processing system 300 and these elements are shown in FIG. 8 with the same reference numerals. That is, the graphics processing system 800 includes a block of queues 312 comprising four queues $314_1$ to $314_4$; a processing module 302; a block 304 of depth buffers $318_1$ to $318_4$; a texturing unit 308 comprising four texturing engines $324_1$ to $324_4$ and a pixel buffer 310. These elements operate as described above in relation to graphics processing system 300. All of the elements of the graphics processing system 800 shown in FIG. 8 may be implemented in hardware, software or a combination thereof.

As described in more detail below, the graphics processing system 800 includes a control module 816, which is similar, but not identical to the control module 316 of the graphics processing system 300. Furthermore, the graphics processing system 800 comprises a tag sorter module 806 which is not the same as the tag sorter module 306 of graphics processing system 300. The tag sorter module 806 comprises a tag control module 822 and eight tag buffers $820_1$ to $820_8$. In this way, there are more tag buffers 820 than depth buffers 318, so more than one tag buffer 820 can be used to store overlapping layers of primitive identifiers for primitives of a particular tile, as described above in relation to one tile with reference to graphics processing system 600. It can therefore be seen that there is a group of eight tag buffers 820, and the graphics processing system 800 (in particular the tag control module 822) is configured to dynamically associate, with each of the depth buffers 318, a respective set of one or more of the eight tag buffers 820. The association of the tag buffers with the depth buffers (which corresponds to an association of the tag buffers with the tiles that are being processed) is performed dynamically in the sense that it can be altered to suit the current requirements of the graphics processing system 800.

For example, if none of the tag buffers 820 of a set which is currently associated with a particular tile are available at a sample position when a primitive identifier of a primitive covering that sample position is received at the tag sorter module 806, then the tag control module 822 can add an available tag buffer 820 to the set of tag buffers that is associated with that tile. The additional tag buffer 820 in the set represents a new layer of primitives for the tile, and the primitive identifier can be stored in the additional tag buffer representing the new layer.

If (in the same way as in the example given above) a primitive identifier is to be stored at a sample position to a tag buffer of the set of tag buffers associated with a particular tile, but none of the tag buffers of the set are available at the sample position, and if (unlike in the example given above) there are no available tag buffers in the group of tag buffers ($820_1$ to $820_8$), then the tag control module 822 may flush the primitive identifiers from one of the tag buffers $820_1$ to $820_8$ thereby making that tag buffer available such that the primitive identifier can be stored in the available tag buffer. The tag buffer selected for flushing may or may not be a tag buffer that is currently a member of the set of tag buffers associated with the tile. By flushing a tag buffer associated with one tile, and then re-associating the flushed tag buffer with a different tile, the tag buffer is moved to a different set.

There may be a predetermined maximum number of tag buffers 820 which can be included in one of the sets of tag buffers 820 associated with a tile. For example, the tag control module 822 might not associate more than four of the tag buffers 820 to any given tile.

The distribution of objects within a scene is likely to be such that some tiles contain translucent objects, and some do not. Of those tiles that contain translucent objects, the complexity of the scene, i.e. the number of layers of translucency, may vary considerably. The flexibility in the association between tag buffers 820 and tiles allows the tag buffers 820 to be used to best suit the current needs of the graphics processing system 800.

As in the graphics processing system 300 described above, the flushed primitive identifiers are passed to the texturing unit 308. One of the texturing engines $324_1$ to $324_4$ applies texturing and shading to the primitives identified by the flushed primitive identifiers. As described above, a texturing engine 324 retrieves texture data and the identified primitives (e.g. from a memory) and applies the texture data to the primitives identified by the flushed primitive identifiers. In the example shown in FIG. 8 there are four texturing engines $324_1$ to $324_4$, i.e. there are the same number of texturing engines 324 as there are depth buffers 318, and in this case each of the texturing engines is associated with a respective tile such that all of the texturing that is applied to the primitives of a particular tile is performed by the same texturing engine 308. As described above, this may improve the efficiency of texturing the primitives in the case that there are multiple tiles in flight. As described above, the texturing unit 308 outputs a set of pixel values for the image which are then stored in the pixel buffer 310. In other examples, the number of texturing engines 324 may be different to the number of depth buffers 318 and in that case each of the texturing engines might not be associated with a respective tile.

As mentioned above the control module 816 is similar to the control module 316 of the graphics processing system 300. However, the control module 816 can further control which primitives are processed by the processing module 302 to thereby control the switching of the processing module 302 between processing primitives for different tiles, based on the number of tag buffers 820 in the sets of tag buffers 820 which are associated with the different tiles. For example, if there are lots of tag buffers 820 associated with a particular tile, the control module 816 may control the block of queues 312 to prioritise the output of primitives for that tile. Having lots of tag buffers 820 associated with a tile may allow the graphics processing system 800 to process the primitives for that tile more efficiently and as such the control module 816 may control the processing module 302 to preferentially process primitives from that tile.

Figure 9A:
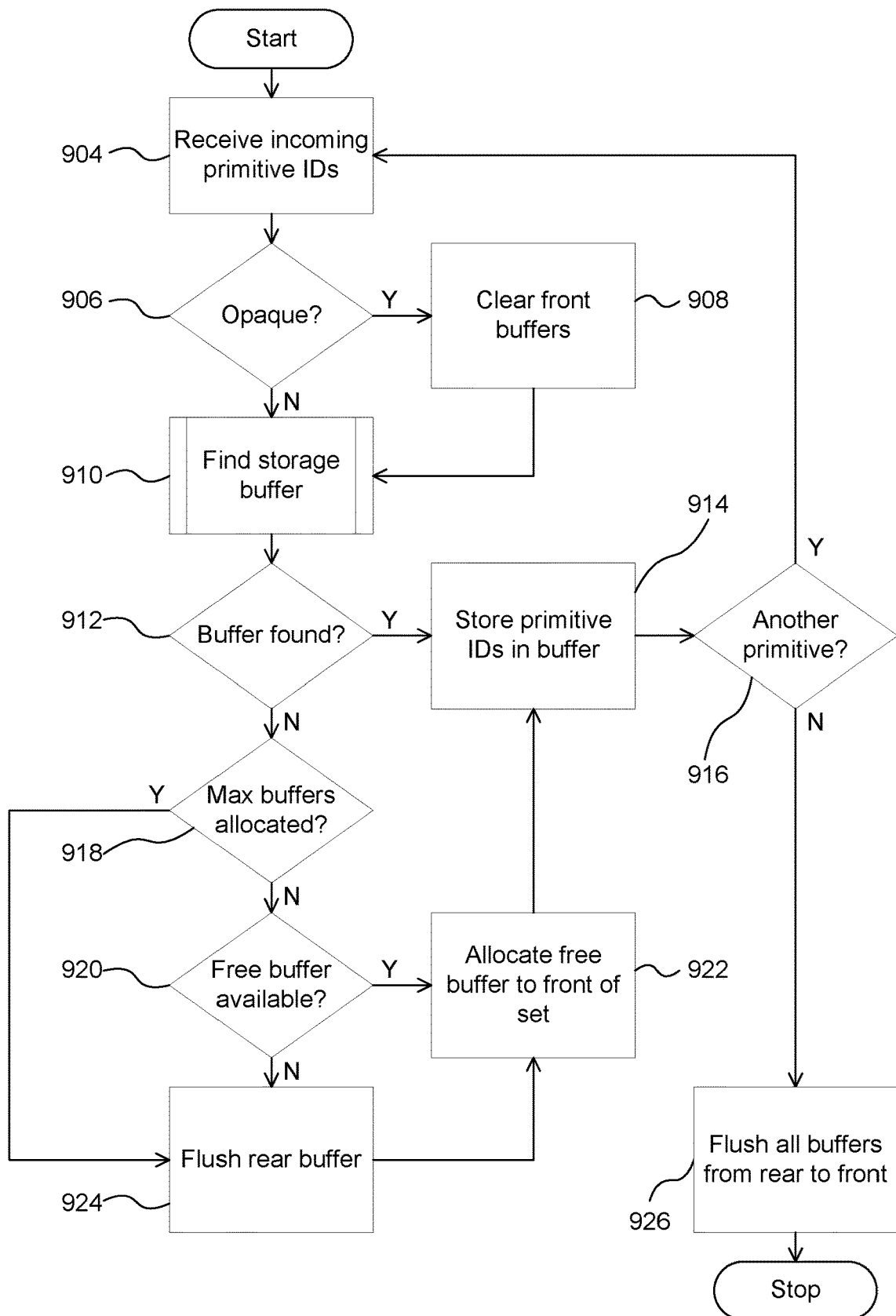
FIGS. 9a and 9b show a flow chart for a method of controlling the selection of tag buffers and the flushing of tag buffers.
Figure 9B:
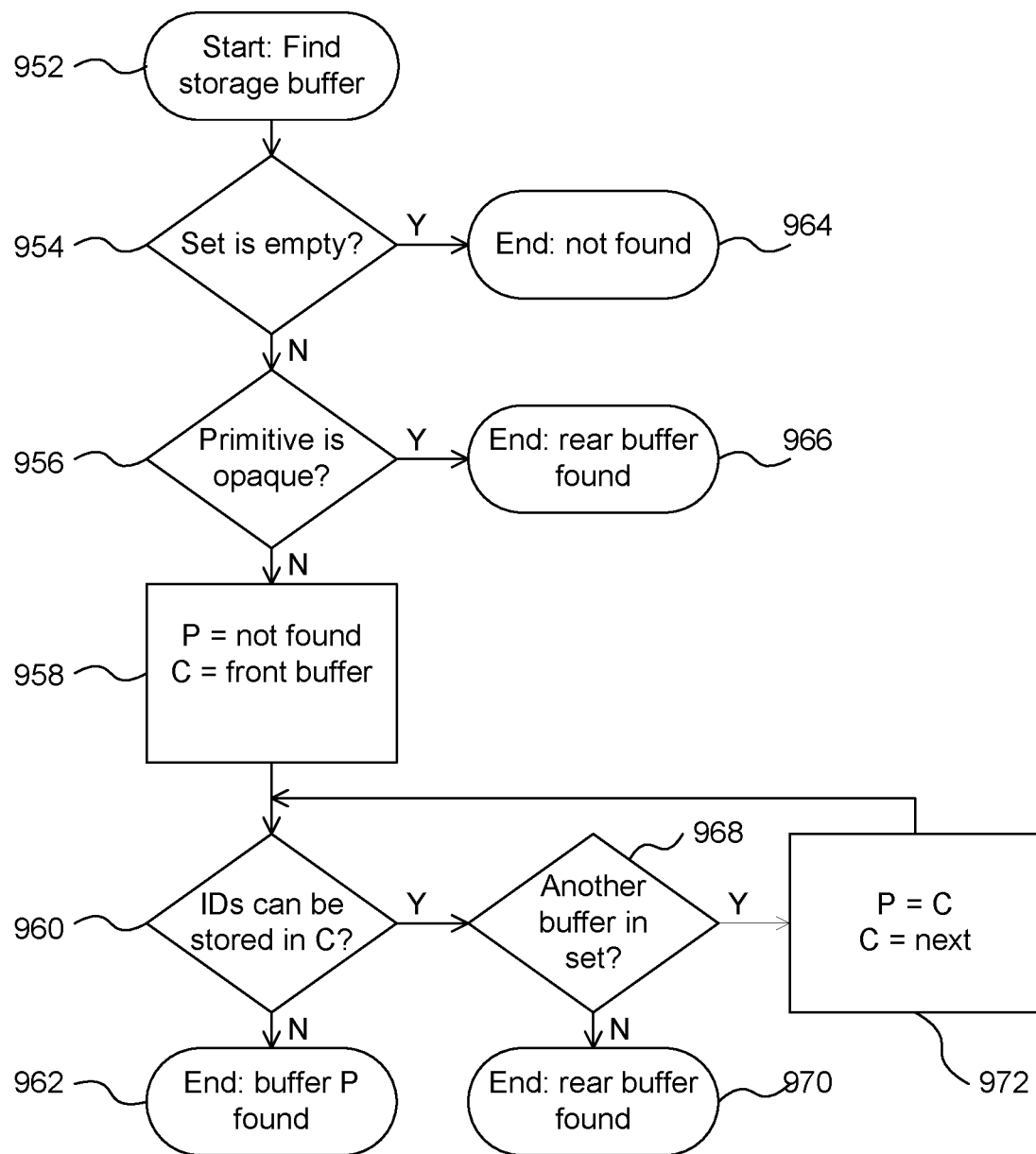

FIGS. 9a and 9b show a flow chart for a method by which a tag control module 822 may control the selection of tag buffers for storing incoming primitive identifiers of a tile and the flushing of tag buffers in an example.

Initially, no tag buffers are associated with the tile. At step 904 a set of primitive IDs are received. These primitive IDs correspond to a single primitive, and to sample positions within the tile according to the positions at which the primitive has been determined to be visible. The primitive may be opaque or translucent. At step 906 a decision is made according to whether the primitive is opaque or translucent, and if the primitive is not translucent (i.e. if it is opaque), then at step 908 a clearing process occurs. Step 908 will be described further below. In the initial case, where no tag buffers are allocated, step 908 has no effect. At step 910 the tag control module 822 searches for a tag buffer in which to store the primitive IDs. The process within block 910 is described in more detail below, and in FIG. 9b. At step 912, the result of the search process 910 is tested. If the search was successful and a tag buffer was found, the flow advances to step 914, and the primitive IDs are stored in the tag buffer that was found. However, in the initial case there are no tag buffers in the set associated with the tile, and so search 910 will fail to find a suitable tag buffer. In this case the flow advances to a series of steps that will attempt to add a new tag buffer to the set associated with the tile. Step 918 tests whether the set of tag buffers is already of a predetermined maximum size, and step 920 checks to see whether there is an available buffer that is not currently associated with a tile. In the initial case, flow will proceed to step 922 in which a free tag buffer will be added to the set associated with the tile. The primitive IDs may then be stored in the tag buffer, in step 914. At step 916 a test is made to determine whether there are more primitives to be processed. Flow proceeds accordingly, either to step 904, in order to receive further primitive IDs, or to step 926 in which all the buffers are flushed (in order, from rear to front), and the process ends.

The sub-process of step 910 is shown in FIG. 9b. Note that for simplicity of explanation, FIGS. 9a and 9b illustrate a system in which selection of a tag buffer for storing the primitive identifiers of a primitive is performed at the scale of whole tiles, rather than at the scale of microtiles or at the scale of individual samples. Examples in which a tag buffer is selected per-pixel, or per-microtile, may be implemented using straightforward modifications to the technique described here as will be apparent to a person skilled in the art. The process begins at 952, and at 954 a test is made to determine whether the set of tag buffers allocated to the tile is empty. If the set is empty then at 964 the sub-process ends and reports that a buffer was not found. When the set contains at least one buffer, the processing differs depending on whether the primitive is opaque or translucent. This is tested at 956, and in the simple case of an opaque primitive, the sub-process ends at 966 and reports that the rear buffer, i.e. the tag buffer representing the layer furthest from the viewer is available to store primitive IDs. The remaining steps are used when step 956 identifies that the primitive is translucent. In this case the aim of the sub-process is to search the tag buffers in front to rear order and to report the rear-most layer in which it is possible to store the primitive IDs. At 958, variables P and C represent the previous and current tag buffers respectively. C is initialised to indicate the front-most buffer. P will indicate the buffer one layer closer to the front than C, however, since there is no closer buffer, P is initialised with a value indicating no buffer. At 960 a test is made to determine whether all of the primitive IDs can be stored in the buffer indicated by C. The process ends when it is found that the primitive IDs cannot be stored in C, as at this point it is known that the buffer indicated by P must be the rear-most layer in which it is possible to store the primitive IDs. Step 962 returns the identity of buffer P. In the event that the test fails for the front most layer, the value of P will indicate directly that no buffer was found, due to the way that P was initialised in step 958. If the process does not end, i.e. the primitive IDs can be stored in buffer C, the process continues to step 968 which determines whether there is another buffer representing a layer deeper than the current buffer C. If not, then C is the rear-most buffer, and the primitive IDs may be stored in it, so at 970 the identity of buffer C is returned. If another buffer does exist then step 972 adjusts P and C by one step backwards, such that P stores the identity of what was the current buffer, and C stores the identity of the buffer immediately behind the current buffer. Flow returns to the test of step 960, where the test is performed to see if the primitive IDs can be stored in the buffer now represented by C.

Returning to FIG. 9a, the result of sub-process 910 is tested at 912 to determine whether a suitable buffer was found. If a buffer was found then the primitive IDs are stored in it, in step 914. When a buffer is not found, steps 918-922 are used to allocate a new tag buffer to the set, and step 914 then stores the primitive IDs in the new buffer. Generally, the new buffer is allocated from a pool of free buffers. However, it is may not be desirable for the set of buffers associated with one tile to grow without limit, particularly if the pool of buffers is shared with several other tiles, e.g. as shown in FIG. 8. The test in step 918 may be used to limit the number of buffers in a set, and, by directing flow to step 924, to cause the rear-most buffer to be flushed (i.e. the contents of the buffer are sent to texturing and shading unit 308). The flushed buffer may then be recycled and added to the set as a new front buffer in step 922. In another situation, the pool of free buffers may be empty, e.g. the buffers have been allocated to sets associated with other tiles. This is detected by the test in step 920. Again, flow is directed to step 924, when a buffer is flushed to create a new free buffer. In the case that the flow reached step 924 from step 920, rather than from step 918, it is possible for the buffer selected for flushing to be a member of a set other than the one associated with the current tile. That is, provided that it is permissible to extend a set, the set may be extended by flushing and transferring a buffer from another set. In this way, under the control of the control module 816 and/or the tag sorter control module 822, the tag buffers may be allocated flexibly according to the requirements of the system.

When an opaque primitive is identified at step 906, step 908 performs a clearing operation. The tag sorter receives only primitive IDs for fragments that have passed a depth test. It is therefore known that opaque primitive IDs must be in front of, and therefore will occlude, any other opaque or translucent primitives that have already been processed. The primitive IDs for opaque objects may therefore always be stored in the rear-most tag buffer. Steps 956 and 966 of sub-process 910 will identify opaque objects and return the identity of the rear-most buffer. Step 908 clears the stored primitive IDs for any translucent objects already stored in any buffer layer, at the positions corresponding to the opaque primitive IDs. This has the effect of flattening the layer structure, ensuring that translucent fragments are not rendered unnecessarily or incorrectly. Optionally, step 308 may determine that the clearing process has left a tag buffer completely empty, and return the empty layer to the pool of free buffers.

As described above, punch-through primitives are rendered in two passes. On the first pass, before the transparency has been evaluated, primitive IDs for punch-through primitives may be handled as for translucent primitives. On the second pass, a punch-through primitive ID corresponds to a part of the object that is known to be opaque. Therefore, on the second pass, primitive IDs for punch-through primitives may be handled as for opaque primitives.

Examples are described above in detail which relate to receiving primitive identifiers of translucent primitives at the tag sorter module. The same principles can be used when primitive identifiers for primitives which have textures including punch through are received.

The methods described herein could be implemented by running suitable computer readable code which is adapted to perform the steps of the methods. Furthermore, the graphics process systems described herein could be generated by running suitable computer readable code. The computer readable code could be encoded on a computer readable storage medium.

Generally, any of the functions, methods, techniques or components described above can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation, the module, functionality, component, block, unit or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. For example, the specific numbers given in the examples described above (e.g. the numbers of tag buffers, depth buffers, queues, texturing engines, tiles, microtiles within a tile and sample positions within a microtile) are given by way of example only. The steps of the methods described herein may be carried out in any suitable order, or simultaneously where appropriate. Aspects of any of the examples described above may be combined with aspects of any of the other examples described to form further examples without losing the effect sought.

What is claimed is:

1. A graphics processing unit configured to use a rendering space which is sub-divided into tiles, the graphics processing unit comprising:
    a plurality of depth buffers, different ones of the depth buffers being associated with different tiles;
    three or more tag buffers, wherein there are more tag buffers than there are depth buffers; and
    a tag control module configured to dynamically associate, with tiles, respective sets of one or more of the tag buffers;
    wherein the graphics processing unit is configured to process a particular tile using the depth buffer and the set of one or more tag buffers associated with the particular tile.

2. The graphics processing unit of claim 1, wherein the set of one or more tag buffers associated with the particular tile comprises a plurality of tag buffers.

3. The graphics processing unit of claim 2, wherein the plurality of tag buffers in the set of tag buffers associated with the particular tile are configured to store overlapping layers of primitive identifiers for primitives of the particular tile.

4. The graphics processing unit of claim 1, wherein the tag control module is configured to dynamically associate, with tiles, respective sets of one or more of the tag buffers by controlling selection of a tag buffer for storage of a primitive identifier, wherein the selection of a tag buffer is made according to layering of the primitives identified by the primitive identifiers stored in the tag buffers.

5. The graphics processing unit of claim 2, wherein the set of tag buffers associated with the particular tile is configured to store primitive identifiers of primitives for a plurality of sample positions, wherein primitive identifiers stored at corresponding sample positions in the tag buffers of the set represent overlapping layers of primitives.

6. The graphics processing unit of claim 1, further comprising one or more processing engines configured to process fragments of primitives identified by primitive identifiers which have been outputted from a tag buffer.

7. The graphics processing unit of claim 6, wherein the number of depth buffers is the same as the number of processing engines.

8. The graphics processing unit of claim 6, wherein the one or more processing engines are configured to apply one or both of texturing and shading to the fragments of the primitives identified by primitive identifiers which have been outputted from a tag buffer.

9. The graphics processing unit of claim 6, wherein the graphics processing unit is configured such that all of the primitive identifiers in a set of one or more tag buffers associated with the particular tile are sent to the same processing engine, such that all of the processing that is performed on fragments of the primitives of the particular tile is applied by the same processing engine.

10. The graphics processing unit of claim 1, further comprising a processing module configured to receive primitives to be processed for a tile of the rendering space, wherein the processing module is configured to perform hidden surface removal for primitives of the tile to determine primitive identifiers identifying the primitives which are visible at a plurality of sample positions in the tile, wherein the determined primitive identifiers are stored in the set of tag buffers.

11. The graphics processing unit of claim 1, wherein the graphics processing unit is configured to have multiple tiles in flight at a given time.

12. The graphics processing unit of claim 11, wherein the graphics processing unit is configured to allow the processing of primitives to switch between primitives of different tiles when some but not all of the primitives of a particular tile have finished being processed by the processing module.

13. The graphics processing unit of claim 11, wherein each of the depth buffers is configured to be dynamically associated with a respective one of said multiple tiles which are in flight at a given time.

14. The graphics processing unit of claim 1, wherein there is a predetermined maximum number of tag buffers which can be included in one of the sets of one or more tag buffers associated with a tile.

15. The graphics processing unit of claim 1, wherein the tag control module is configured to control flushing of primitive identifiers from the tag buffers, wherein the tag control module is configured to determine which of the tag buffers to flush based on a flushing strategy.

16. The graphics processing unit of claim 1, wherein the tag control module is configured such that if a primitive identifier is to be stored at a sample position in a tag buffer of the set of one or more tag buffers associated with the particular tile, but none of the tag buffers of the set are available at the sample position, then the tag control module adds an available tag buffer from a pool of tag buffers to the set of tag buffers that is associated with the particular tile.

17. The graphics processing unit of claim 1, wherein the tag control module is configured such that if a primitive identifier is to be stored at a sample position in a tag buffer of the set of one or more tag buffers associated with the particular tile, but none of the tag buffers of the set are available at the sample position, and if there are no available tag buffers in a pool of tag buffers, then the tag control module flushes the primitive identifiers from one of the tag buffers in the pool thereby making that tag buffer available such that the primitive identifier can be stored in the available tag buffer.

18. A method of processing primitives in a graphics processing system having a rendering space which is sub-divided into tiles, the graphics processing system comprising a plurality of depth buffers and three or more tag buffers, wherein the graphics processing system has more tag buffers than depth buffers, the method comprising:
- dynamically associating, with each of a plurality of tiles, one of the depth buffers and a set of one or more of the tag buffers; and
- processing a particular tile using the depth buffer and the set of one or more tag buffers associated with the particular tile.

19. The method of claim 18, wherein the set of one or more tag buffers associated with the particular tile comprises a plurality of tag buffers, and wherein said dynamically associating, with each of a plurality of tiles, one of the depth buffers and a set of one or more of the tag buffers comprises selecting a tag buffer for storage of a primitive identifier, wherein the selection of a tag buffer is made according to layering of the primitives identified by the primitive identifiers stored in the tag buffers.

20. A non-transitory computer readable storage medium having encoded thereon computer readable code that when processed configures a system to generate a graphics processing unit which is configured to use a rendering space which is sub-divided into tiles, the graphics processing unit comprising:
- a plurality of depth buffers, different ones of the depth buffers being associated with different tiles;
- three or more tag buffers, wherein there are more tag buffers than there are depth buffers; and
- a tag control module configured to dynamically associate, with tiles, respective sets of one or more of the tag buffers;
- wherein the graphics processing unit is configured to process a particular tile using the depth buffer and the set of one or more tag buffers associated with the particular tile.

* * * * *